H. JONES.
Vehicle-Axle Box.

No. 218,275.  Patented Aug. 5, 1879.

Attest:
C. Clarence Poole
L. W. Seely

Inventor:
Henry Jones
by Geo. W. Dyer
Atty.

UNITED STATES PATENT OFFICE

HENRY JONES, OF COSHOCTON, OHIO.

IMPROVEMENT IN VEHICLE-AXLE BOXES.

Specification forming part of Letters Patent No. 218,275, dated August 5, 1879; application filed January 4, 1879.

*To all whom it may concern:*

Be it known that I, HENRY JONES, of Coshocton, in the county of Coshocton and State of Ohio, have invented a new and useful Improvement in Axle-Boxes; and I do hereby declare that the following is a full and exact description of the same, reference being had to the accompanying drawings, and to the letters of reference marked thereon.

The object of my invention is to compensate for the wear of the axles and boxes of vehicles, so as to prevent lateral motion, and to always keep the axle boxes tight between the shoulders on the axle and the holding-nuts, and also to produce means for this purpose which will be simple and cheap in construction and durable in use; and it consists, mainly, in constructing the axle-box so that when necessary to take up the wear it can be lengthened; in providing the small end of the axle-box with a peculiar adjustable cap; in placing washers within the said cap and between the shoulder in the same and the small end of the axle-box; and, further, in the peculiar nut for adjusting the cap, as fully hereinafter explained.

Figure 1:
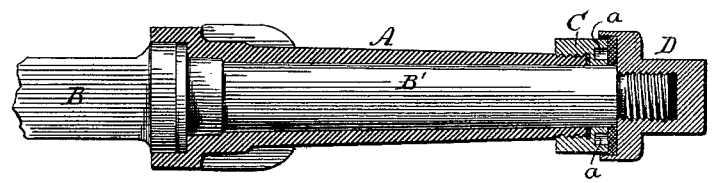
Figure 2:
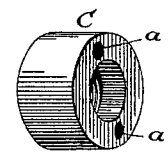
Figure 3:
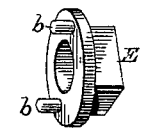

In the drawings, Figure 1 is a sectional view of the cap and box; Fig. 2, a separate view of the adjustable cap; and Fig. 3, a view of the nut used in adjusting the cap.

Like letters denote corresponding parts.

A represents the axle-box, and B B' the axle and axle-skein, all of the usual construction, except that the small or outer end of the axle-box is screw-threaded for a short distance to allow the adjustable cap C to be placed thereon. This cap (shown more particularly in Fig. 2) is of annular form, and for a portion of its interior surface is screw-threaded, thus permitting it to make a close joint with the end of the axle-box, so that it will form a continuation of the bore thereof when placed upon its ends and the two parts screwed tightly together.

The cap, on its outer end, is provided with two or more holes, *a*, by which it is adjusted, as will be hereinafter described.

The end of the axle-skein is screw-threaded, as usual, and a screw-nut, D, is placed thereon, with a washer or packing-ring of ordinary construction, which bears against the ring or cap C, instead of against the axle-box, as in vehicles as ordinarily constructed.

In the use of my axle-box, when the parts are worn so that the axle-box has a slight lateral movement on the axle-skein, the screw-nut D is removed from the end of the axle-skein and the cap C removed from the end of the box. To do this the nut E (shown in perspective in Fig. 3) is employed. This nut is of the form shown in said figure, and is provided on its inner circular side with two or more studs or pins, *b*, which are placed in the holes *a* in the cap C, when, by means of a wrench, the cap is removed. A washer or packing-ring of the required thickness is then placed upon the screw-threaded end of the axle-box, and the cap C screwed down upon it by means of the nut E.

It will be seen that this operation results in a practical lengthening of the axle-box, and, the nut D being placed on the axle-skein, the increased length of the axle-box prevents its lateral movement.

As fast as the parts are worn this operation can be repeated, and it will thus be seen that any lateral or vibratory movement of the axle-box is rendered impossible.

The advantages afforded by the use of this device will be readily understood, and require no enumeration.

Having thus described my invention and explained its manner of operation, what I claim as new, and desire to secure by Letters Patent, is—

1. An axle-box provided with an adjustable cap, by which the axle-box can be lengthened to compensate for the wear, substantially as and for the purpose set forth.

2. The combination, with the axle-box A, of the cap C, secured by screw-threads on the small end of the box, and forming a continuation of the bore of the said axle-box, for taking up the wear by lengthening the axle-box, substantially as described and shown.

3. The combination, with the axle-box A, screw-threaded at its small end, of the screw-threaded cap C, turning on the axle-box, and having a shoulder adapted to be set against the small end of the axle-box, and the washers placed within the cap between the axle-box and the said shoulder, for lengthening the axle-box, constructed and arranged substantially as described and shown.

4. The axle-box A, having screw-threaded small end, and the compensating-cap C, provided with holes $a$, in combination with the nut E, having pins $b$, substantially as and for the purpose set forth.

This specification signed and witnessed this 13th day of August, 1879.

HENRY JONES.

Witnesses:
ALEX. McCLURE,
J. S. ELLIOTT.